US009667391B2

United States Patent
Lee et al.

(10) Patent No.: US 9,667,391 B2
(45) Date of Patent: May 30, 2017

(54) CHANNEL ESTIMATION METHOD AND APPARATUS FOR COOPERATIVE COMMUNICATION IN CELLULAR MOBILE COMMUNICATION SYSTEM

(71) Applicant: Samsung Electronics Co., Ltd., Gyeonggi-do (KR)

(72) Inventors: Hyojin Lee, Gyeonggi-do (KR); Younsun Kim, Gyeonggi-do (KR); Yongjun Kwak, Gyeonggi-do (KR); Juho Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 220 days.

(21) Appl. No.: 14/032,574

(22) Filed: Sep. 20, 2013

(65) Prior Publication Data

US 2014/0078990 A1    Mar. 20, 2014

(30) Foreign Application Priority Data

Sep. 20, 2012  (KR) .................. 10-2012-0104474
Sep. 25, 2012  (KR) .................. 10-2012-0106503

(51) Int. Cl.
| | | |
|---|---|---|
| *H04L 5/00* | (2006.01) | |
| *H04L 1/00* | (2006.01) | |
| *H04B 7/024* | (2017.01) | |
| *H04B 7/06* | (2006.01) | |
| *H04L 25/02* | (2006.01) | |

(52) U.S. Cl.
CPC .......... *H04L 5/0035* (2013.01); *H04B 7/024* (2013.01); *H04B 7/0619* (2013.01); *H04B 7/0647* (2013.01); *H04L 1/003* (2013.01); *H04L 1/0026* (2013.01); *H04L 1/0029* (2013.01); *H04L 5/001* (2013.01); *H04L 5/0057* (2013.01); *H04L 25/0204* (2013.01)

(58) Field of Classification Search
None
See application file for complete search history.

(56) References Cited

U.S. PATENT DOCUMENTS

| | | | | |
|---|---|---|---|---|
| 8,345,605 | B2* | 1/2013 | Shen et al. ................. | 370/329 |
| 9,226,272 | B2* | 12/2015 | Lee ........................ | H04L 1/0026 |
| 2011/0249582 | A1* | 10/2011 | Choi ..................... | H04L 5/0091 |
| | | | | 370/252 |
| 2011/0319068 | A1* | 12/2011 | Kim ....................... | H04L 1/1671 |
| | | | | 455/422.1 |
| 2012/0063324 | A1* | 3/2012 | Kim et al. ................. | 370/241 |
| 2012/0088458 | A1* | 4/2012 | Nogami ................. | H04B 7/0632 |
| | | | | 455/67.11 |
| 2012/0208547 | A1* | 8/2012 | Geirhofer et al. ......... | 455/452.2 |
| 2012/0236812 | A1* | 9/2012 | Chen et al. .................. | 370/329 |

(Continued)

*Primary Examiner* — Bunjob Jaroenchonwanit
(74) *Attorney, Agent, or Firm* — The Farrell Law Firm, P.C.

(57) ABSTRACT

A method and an apparatus are provided for a data transmission/reception in a terminal in a CoMP system is provided. One or more valid subframes are determined for updating feedback information. The feedback information is updated at each of the valid subframes. A feedback information scheduling signal is received at a predetermined subframe. Feedback information updated at a most recent valid subframe, from among previous subframes, is transmitted according to the feedback information scheduling signal.

18 Claims, 16 Drawing Sheets

(56) References Cited

U.S. PATENT DOCUMENTS

| | | | |
|---|---|---|---|
| 2013/0286933 A1* | 10/2013 | Lee | H04L 1/0026 370/315 |
| 2014/0105055 A1* | 4/2014 | Kang et al. | 370/252 |
| 2014/0112300 A1* | 4/2014 | Han | H04W 24/04 370/329 |
| 2014/0233663 A1* | 8/2014 | Kang | H04L 5/0037 375/260 |
| 2014/0321396 A1* | 10/2014 | Choi | H04L 5/0091 370/329 |
| 2015/0117352 A1* | 4/2015 | Nammi | H04L 12/00 370/329 |
| 2015/0208397 A1* | 7/2015 | Lee | H04L 5/0048 370/329 |
| 2015/0215931 A1* | 7/2015 | Aiba | H04L 1/1893 370/329 |

\* cited by examiner

CHANNEL ESTIMATION METHOD AND APPARATUS FOR COOPERATIVE COMMUNICATION IN CELLULAR MOBILE COMMUNICATION SYSTEM

PRIORITY

This application claims priority under 35 U.S.C. 119(a) to applications filed in the Korean Intellectual Property Office on Sep. 20, 2012 and Sep. 25, 2012, and assigned Serial Nos. 10-2012-0104474 and 10-2012-0106503, respectively, the contents of which are incorporated herein by reference.

BACKGROUND OF THE INVENTION

1. Field of the Invention

The present disclosure relates generally to a channel estimation method and apparatus of a terminal in a cellular mobile communication system including a plurality of base stations and, more particularly, to a method and an apparatus for estimating channel efficiency in a Cooperative Multi-Point (CoMP) system supporting cooperative downlink transmission from a plurality of base stations to a terminal.

2. Description of the Related Art

Mobile communication systems have evolved into high-speed, high-quality wireless packet data communication systems that provide data and multimedia services beyond the early voice-oriented services. Recently, various mobile communication standards, such as High Speed Downlink Packet Access (HSDPA), High Speed Uplink Packet Access (HSUPA), Long Term Evolution (LTE), and LTE-Advanced (LTE-A) defined in $3^{rd}$ Generation Partnership Project (3GPP), High Rate Packet Data (HRPD) defined in $3^{rd}$ Generation Partnership Project-2 (3GPP2), and 802.16 defined in IEEE, have been developed to support the high-speed, high-quality wireless packet data communication services.

Particularly, LTE is a communication standard developed to support high speed packet data transmission and to maximize the throughput of the radio communication system with various radio access technologies. LTE-A is an evolved version of LTE that improves data transmission capability.

The existing $3^{rd}$ generation wireless packet data communication systems (including, for example, HSDPA, HSUPA, and HRPD) adopt Adaptive Modulation and Coding (AMC) and channel-sensitive scheduling techniques to improve transmission efficiency.

In a wireless packet data communication system that adopts AMC, the transmitter is capable of adjusting the data transmission amount based on the channel condition. Specifically, the transmitter decreases the data transmission amount for bad channel conditions so as to fix the received signal error probability at a certain level, and increases the data transmission amount for good channel conditions so as to transmit a large amount of information efficiently while maintaining the received signal error probability at an intended level.

In a wireless packet data communication system that adopts channel-sensitive scheduling, the transmitter serves a user having good channel conditions first among a plurality of users so as to increase the system capacity, as compared to allocating a channel to one user. Such an increase of system capacity is referred to as multi-user diversity gain.

When using AMC along with a Multiple Input Multiple Output (MIMO) transmission scheme, it may be necessary to take a number of spatial layers and ranks for transmitting signals into consideration. The transmitter determines the optimal data rate in consideration of the number of layers for use in MIMO transmission.

In general, OFDMA is expected to provide superior system throughput as compared to CDMA. One of the main factors that allows OFDMA to increase system throughput is frequency domain scheduling capability. As channel sensitive scheduling increases the system capacity using a time-varying channel characteristic, OFDM can be used to obtain more capacity gain using a frequency-varying channel characteristic.

Research has been conducted to replace CDMA, used in $2^{nd}$ and $3^{rd}$ legacy mobile communication systems, with OFDMA for the next generation wireless communication system. Standardization of 3GPP and 3GPP2 is being conducted for an OFDMA-based evolved system.

FIG. 1 is a diagram illustrating a structure of a radio frame of an LTE-A system.

Referring FIG. 1, a radio frame consists of 10 subframes, and each subframe consists of two slots. The subframes constituting one radio frame are designated by indices 0 through 9, and the slots are designated by indices 0 through 19 (#0~#19).

FIG. 2 is a diagram illustrating a cellular mobile communication system in which the transmit/receive antennas are arranged at the center of the cells.

Referring to FIG. 2, in the cellular mobile communication system composed of a plurality of cells, a User Equipment (UE) receives a mobile communication service from a cell selected in a semi-static duration using the above described techniques. The cellular mobile communication system may include three cells 100, 110, and 120. The cell 100 serves UEs 101 and 102 within its service area, the cell 110 serves UE 111, the cell 120 serves UE 121, and reference numbers 130, 131, and 132 denote the evolved Node Bs (eNBs).

The UE 102 served by the cell 100 is located far from the eNB 130 as compared to the UE 101. The UE 102 experiences significant interference from the central antenna of the neighbor cell 120 and is served by the UE 100 at relatively low data rate.

When the cells 100, 110, and 120 provide the wireless communication services independently, they transmit a Reference Signal (RS) for downlink channel estimation. Particularly, in a 3GPP LTE-A system, the UE measures the channel condition between the eNB and itself using a Cell-specific Reference Signal (CRS) or a Channel Status Information Reference Signal (CSI-RS) transmitted by the eNB.

In the case of the cellular mobile communication system shown in FIG. 2, the UE located at the cell edge suffers significant interference from the neighbor cell and thus cannot be served at a high data rate. Specifically, in the cellular mobile communication system configured as shown in FIG. 2, the ability to allocate the data rate required for providing the UEs with high speed data service within the cell is influenced by UE location within the cell. Accordingly, the conventional cellular mobile communication system is capable providing the UE close to the center of the cell with the data service at a higher data rate, but cannot guarantee the high data rate to the UE located far from the center of the cell. In order to provide the UE located at the cell edge with the data service at a high data rate, a new transmission technique, CoMP, has been proposed for multiple cells to perform transmission to a UE cooperatively in the LTE-A system. In the case of using CoMP transmission technique, multiple CSI-RSs for different cells may be allocated per UE, and thus the UE has to receive the multiple CSI-RSs to estimate multiple channels efficiently.

SUMMARY OF THE INVENTION

The present invention has been made to address at least the above problems and/or disadvantages and to provide at least the advantages described below. Accordingly, an aspect of the present invention provides a method and an apparatus for channel information feedback capable of efficient communication in the communication system supporting CoMP transmission technology.

In accordance with an aspect of the present disclosure, a data transmission/reception method of a terminal in a CoMP system is provided. One or more valid subframes are determined for updating feedback information. The feedback information is updated at each of the valid subframes. A feedback information scheduling signal is received at a predetermined subframe. Feedback information updated at a most recent valid subframe, from among previous subframes, is transmitted according to the feedback information scheduling signal.

In accordance with another aspect of the present invention, a terminal of a CoMP system is provided. The terminal includes a receiver that receives a signal for use in a feedback information update from a base station and a feedback scheduling signal. The terminal also includes a controller that determines one or more valid subframes for updating feedback information, and updates the feedback information at each of the one or more valid subframes based on the received signal. The terminal further includes a transmitter that transmits the feedback information updated at a most recent valid subframe, from among previous subframes, according to the feedback information scheduling signal.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
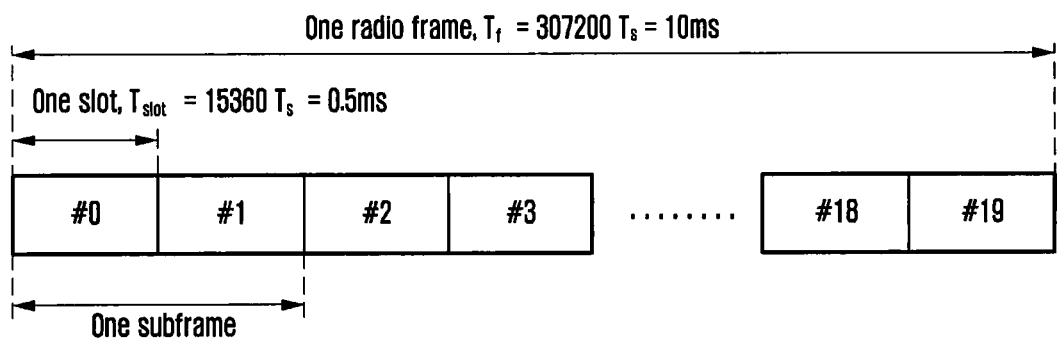
FIG. 1 is a diagram illustrating a structure of a radio frame of an LTE-A system.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The following terms are defined in consideration of the functionality in the present invention, and may vary according to the intention of a user or an operator, their usage, etc. Therefore, the definition should be made on the basis of the overall content of the present specification.

Although the description is directed to an OFDM-based radio communication system, particularly 3GPP EUTRA, it will be understood by those skilled in the art that the present invention can be applied to other communication systems having a similar technical background and channel format, with a slight modification, without departing from the spirit and scope of the present disclosure.

The cellular mobile communication system is composed of a plurality of cells deployed within a restricted area. A cell is defined as a geographic area where UEs are served by an eNB apparatus. A UE is served by a cell which is selected semi-statically. Hereinafter, such a system is referred to as non-CoMP system.

In the non-CoMP system, the UE is assigned a data rate that varies significantly according to its location within the cell. The UE located near the center of the cell is assigned a high data rate, while the UE located far from the center of the cell cannot be assigned such a high data rate. A CoMP system is the system in which multiple cells cooperate for data transmission to the UE located at cell edge. The CoMP system is superior to the non-CoMP system in quality of mobile communication service.

The present invention provides a feedback method and apparatus operating with at least one of Dynamic cell Selection (DS), Dynamic cell collection with Dynamic Blanking (DS/DB), and Joint transmission (JT) techniques.

The DS technique operates in such a way that the UE measures channel station per cell and feeds back the measurement result the eNB, such that the eNB selects a cell for transmitting downlink data to the terminal dynamically.

The DS/DB technique operates in such a way that a specific cell mutes its data transmission to mitigate interference to another cell.

The JT technique operates in such a way that a plurality of cells transmit data to a certain terminal simultaneously. Specifically, the present invention aims to solve the above problems with a feedback mechanism designed to apply DS, DS/DB, and JT schemes efficiently in the LTE-A system.

Figure 3:
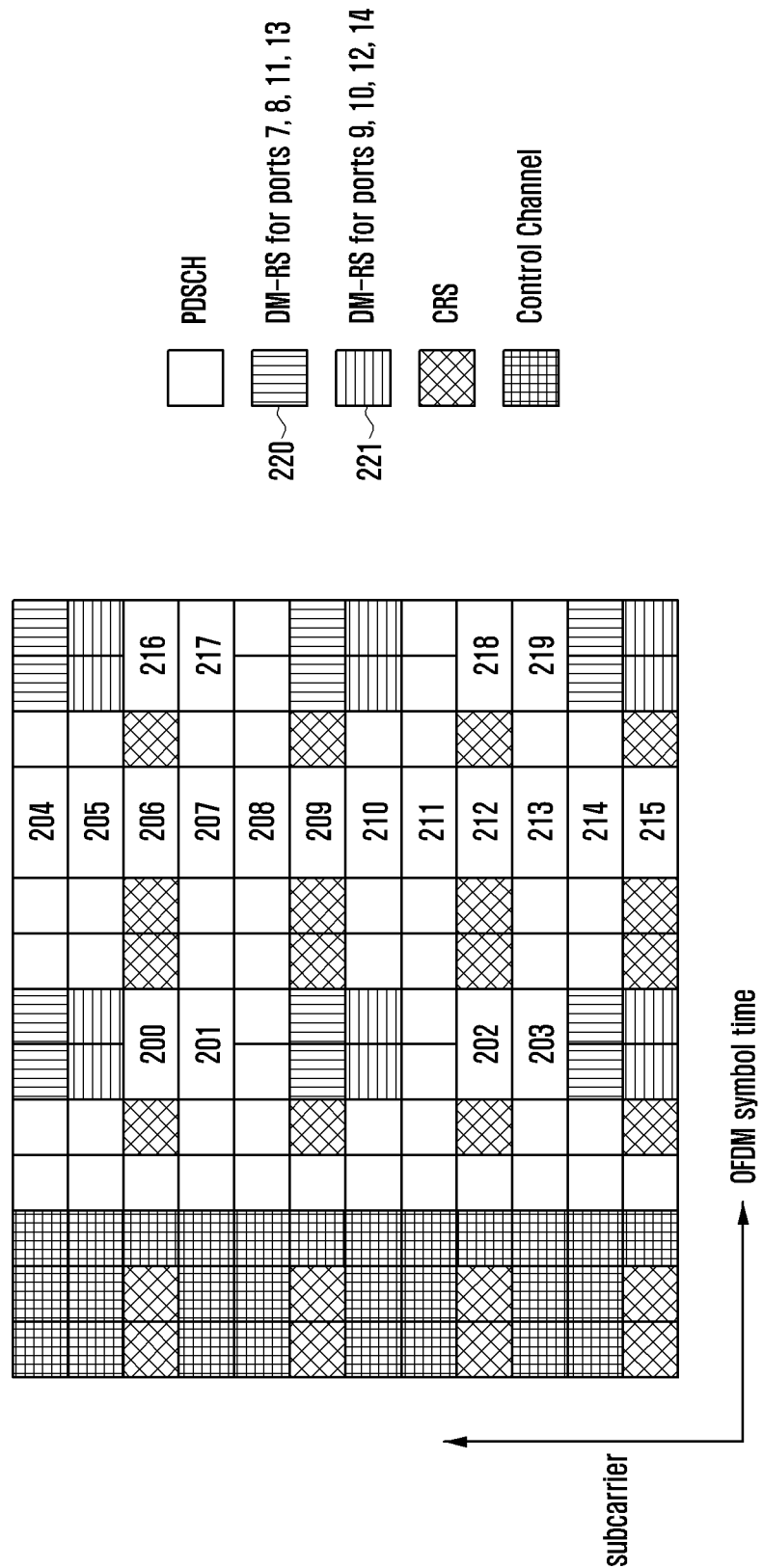
FIG. 3 is a diagram illustrating a resource block with various reference signals transmitted from an eNB to a UE in an LTE system, according to an embodiment of the present invention.

FIG. 3 is a diagram illustrating a resource block with various reference signals transmitted from an eNB to a UE in an LTE system, according to an embodiment of the present invention. A description is made of the signals mapped in the resource block of FIG. 3 using the terms defined in the standards related to LTE-A.

Referring to FIG. 3, two CSI-RS antenna port signals are mapped to each of positions 200 to 219. Specifically, the eNB transmits two CSI-RSs for downlink measurement to the UE at the position 200.

Figure 2:
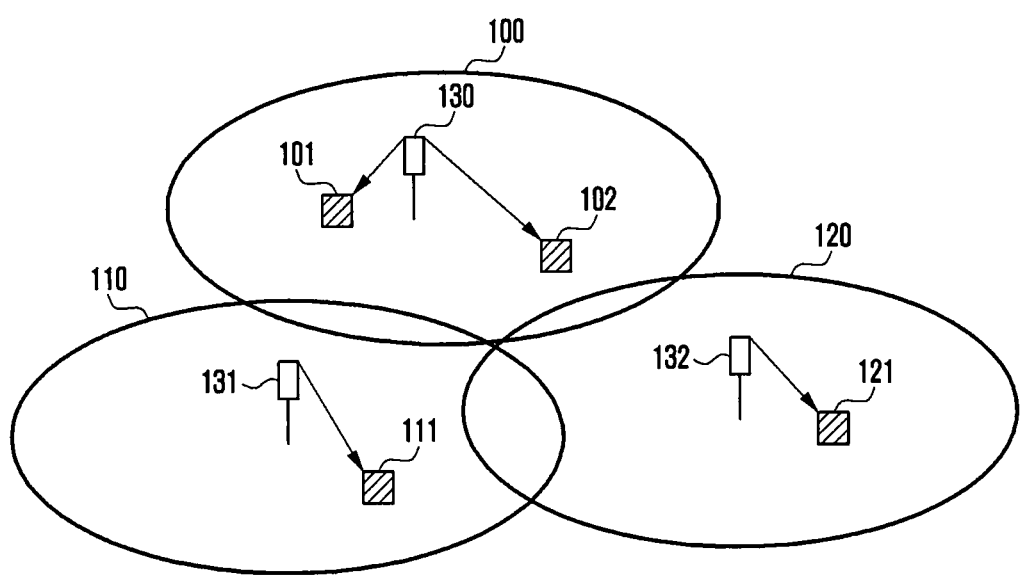
FIG. 2 is a diagram illustrating a cellular mobile communication system in which the transmit/receive antennas are arranged at the center of the cells.

In case of a cellular mobile communication system including a plurality of cells, as depicted in FIG. 2, the CSI-RS is transmitted in different positions corresponding to the respective cells. For example, the CSI-RS is transmitted at the position 200 for the cell 100, the position 205 for the cell 110, and the position 210 for the cell 120. The reason for allocating time-frequency resource for CSI-RS transmission at different positions by cell is to prevent the CSI-RSs of different cells from interfering with each other.

The subframe carrying CSI-RS in downlink is determined by the parameter $I_{CSI-RS}$ transmitted in a Radio Resource Control (RRC) signal. If $I_{CSI-RS}$ is received, the UE determines the subframe interval $T_{CSI-RS}$ for CSI-RS transmission and offset $\Delta_{CSI-RS}$ of the subframe carrying CSI-RS, as shown in Table 1.

TABLE 1

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

The UE receives CSI-RS in the subframe fulfilling Equation (1).

$$(10n_f + \lfloor n_s/2 \rfloor - \Delta_{CSI-RS}) \bmod T_{CSI-RS} = 0 \qquad (1).$$

In Equation (1), $n_f$ denotes a radio frame number, and $n_s$ denotes a slot number in the radio frame.

The 3GPP LTE-A UE estimates a downlink channel using CSI-RS and interference using CRS to generate feedback information of a Rank Indicator (RI), a Channel Quality Indicator (CQI), and a Precoding Matrix Indicator (PMI) to the eNB. The UE performs feedback periodically on a Physical Uplink Control Channel (PUCCH) in one of the following 4 feedback modes:

Mode 1-0: RI, wideband CQI (wCQI)
Mode 1-1: RI, wCQI, wideband PMI (wPMI)
Mode 2-0: RI, wCQI, subband CQI (sCQI)
Mode 2-1: RI, wCQI, wPMI, sCQI, sPMI The feedback timing in the respective feedback mode is determined based on $N_{pd}$, $N_{OFFSET,CQI}$, $M_{RI}$, $N_{OFFSET,RI}$ transmitted through higher layer signaling. In Mode 1-0, the wCQI transmission period is $N_{pd}$, and the feedback timing is determined based on the subframe offset value of $N_{OFFSET,CQI}$.

The RI transmission period is $N_{pd} \cdot M_{RI}$, and RI transmission period offset is $N_{OFFSET,CQI} + N_{OFFSET,RI}$.

Figure 4:
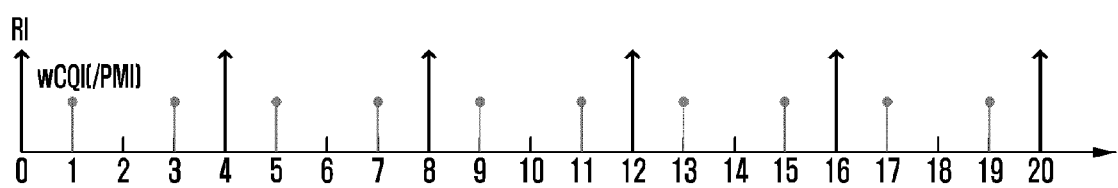
FIG. 4 is a diagram illustrating feedback timings of the UE according to feedback mode 1-0 or 1-1 in an LTE-A system, according to an embodiment of the present invention.

FIG. 4 shows the RI and wCQI feedback timings in the case of $N_{pd}=2$, $M_{RI}=2$, $N_{OFFSET,CQI}=1$, and $N_{OFFSET,RI}=-1$.

Referring to FIG. 4, each timing indicates a subframe index. The feedback mode 1-1 has the same timings as the feedback mode 1-0 with the exception that PMI is transmitted at the wCQI transmission timing together.

In the feedback mode 2-0, the sCQI feedback period is $N_{pd}$ with offset $N_{OFFSET,CQI}$. The wCQI feedback period is $H \cdot N_{pd}$ with offset $N_{OFFSET,CQI}$ equal to the sCQI offset. Here, $H=J \cdot K+1$ where K is transmitted through higher layer signal and J is determined according to the system bandwidth. For example, J is determined as 3 in the 10 MHz system. This means that wCQI is transmitted at every H sCQI transmissions in replacement of sCQI. The RI period $M_{RI} \cdot H \cdot N_{pd}$ with offset $N_{OFFSET,CQI} + N_{OFFSET,RI}$.

Figure 5:
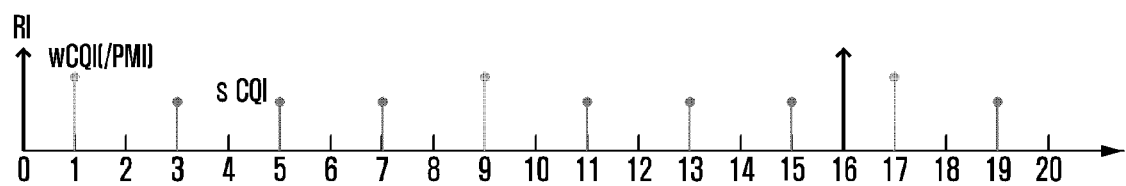
FIG. 5 is a diagram illustrating feedback timings of the UE according to feedback mode 2-0 or 2-1 in an LTE-A system, according to an embodiment of the present invention.

FIG. 5 shows the RI, sCQI, and wCQI feedback timings in the case of $N_{pd}=2$, $M_{RI}=2$, $J=3$ (10 MHz), $K=1$, $N_{OFFSET,CQI}=1$, and $N_{OFFSET,RI}=-1$.

Referring to FIG. 5, the feedback mode 2-1 is identical to the feedback mode 2-0 in feedback timings with the exception that PMI is transmitted at the wCQI transmission timings together.

Unlike the feedback timings for the case of 4 CSI-RS antenna ports as described above, two PMIs have to be transmitted for 8 CSI-RS antenna ports. For 8 CSI-RS antenna ports, the feedback mode 1-1 is divided into two sub-modes. In the first sub-mode, the first PMI is transmitted along with RI, and the second PMI along with wCQI. The wCQI and second PMI feedback period and offset are defined as $N_{pd}$ and $N_{OFFSET,CQI}$, and the RI and first PMI feedback period and offset are defined as $M_{RI} \cdot N_{pd}$ and $N_{OFFSET,CQI} + N_{OFFSET,RI}$, respectively.

For the 8 CSI-RS antenna ports, the feedback mode 2-1 adopts new information of Precoding Type Indicator (PTI) which is transmitted along with RI at period of $M_{RI} \cdot H \cdot N_{pd}$ with the offset of $N_{OFFSET,CQI} + N_{OFFSET,RI}$. For PTI=0, the first and second PMIs and wCQI are transmitted, particularly the wCQI and second PMI at the same timing at a period $N_{pd}$ with an offset of $N_{OFFSET,CQI}$. Meanwhile, the first PMI is transmitted at a period of $H' \cdot N_{pd}$ with an offset of $N_{OFFSET,CQI}$. Here, H' is transmitted through higher layer signaling. For PTI=1, the PTI and RI are transmitted at the same timing, the wCQI and second PMI are transmitted at the same timing, and sCQI is transmitted additionally. In this case, the first PMI is not transmitted. The PTI and RI are transmitted at same period with the same offset as the case of PTI=0, and sCQI is transmitted at a period of $N_{pd}$ with an offset of $N_{OFFSET,CQI}$. Also, the wCQI and second PMI are transmitted at a period of $H \cdot N_{pd}$ with an offset of $N_{OFFSET,CQI}$, and H is set to the same value as the case of 4 CSI-RS antenna ports.

Figure 6:
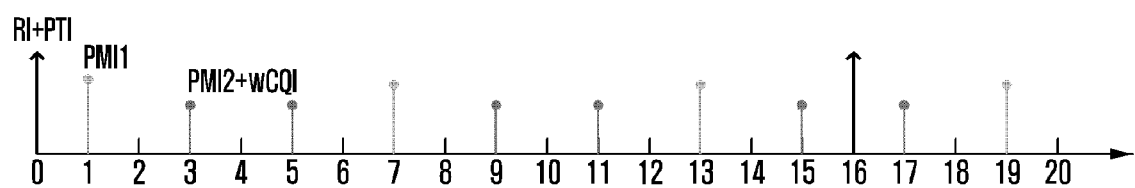
FIG. 6 is a diagram illustrating feedback timings of the UE according to feedback mode 2-0 or 2-1 in an LTE-A system, according to an embodiment of the present invention.
Figure 7:
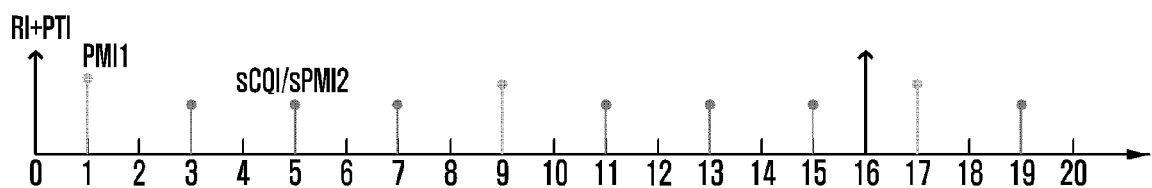
FIG. 7 is a diagram illustrating feedback timings of the UE according to feedback mode 2-0 or 2-1 in an LTE-A system, according to an embodiment of the present invention.

FIGS. 6 and 7 show the feedback timings for PTI=0 and PTI=1 with $N_{pd}=2$, $M_{RI}=2$, $J=3$ (10 MHz), $K=1$, $H'=3$, $N_{OFFSET,CQI}=1$, and $N_{OFFSET,RI}=-1$, respectively.

The downlink channel information estimated based on CSI-RS may be transmitted from the UE to the eNB through non-periodic feedback on a Physical Uplink Shared Channel (PUSCH). If it is necessary to received non-periodic feedback of a certain UE, the eNB may configure the non-periodic feedback indicator included in Downlink Control Information (DCI) for uplink data scheduling of a certain UE so as to perform uplink data scheduling of the corresponding UE. If the non-periodic feedback indicator is received at nth subframe, the UE transmits non-periodic feedback information on PUSCH at $(n+k)^{th}$ subframe.

Here, k denotes a parameter defined in 3GPP LTE Release 10 standard, which is set to 4 for Frequency Division Duplexing (FDD) and one of values in Table 2 for Time Division Duplexing (TDD).

TABLE 2 k values for subframe number n in TDD UL/DL configuration

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

In an LTE-A system, the non-periodic feedback indicator is included in DL DCI format 0 or 4 as one or two-bit information. If the feedback indicator is one bit and if the non-periodic indicator is on, the UE may send the eNB the channel information on the serving cell c on PUSCH non-periodically.

The serving cell c means the downlink Component Carrier (CC) on which the DCI is transmitted in the Carrier Aggregation (CA) mode.

If the non-periodic feedback indicator is two bits, the UE performs non-periodic feedback as defined in Table 3.

TABLE 3

Non-periodic feedback based on two-bit non-periodic feedback indicator

| Value of CSI request field | Description |
|---|---|
| '00' | No aperiodic CSI report is triggered |
| '01' | Aperiodic CSI report is triggered for serving cell$^c$ |
| '10' | Aperiodic CSI report is triggered for a 1st set of serving cells configured by higher layers |
| '11' | Aperiodic CSI report is triggered for a 2nd set of serving cells configured by higher layers |

In Table 3, the service cell c means the downlink CC linked to the uplink CC indicated by a Carrier Indication Field included in DCI for downlink scheduling unlike the case where the non-periodic indicator is one bit. That is, if the non-periodic feedback indicator set to '01' is received, the UE CIF transmits feedback information of the downlink CC linked to the uplink CC indicated by CIF. Otherwise if the non-periodic feedback indicator set to '10' or '11' is received, the UE transmits the feedback information of the downlink CC configured with the priority higher than the UL CC indicated by CIF.

In the case that the non-periodic feedback is configured, the feedback information of each CC is identical with that of the periodic feedback, and includes RI, PMI, and CQI (RI and PMI may not be fed back according to the feedback configuration). The CQI may include both the wCQI and sCQI, or only the wCQI.

In the LTE-A system, a concept of reference subframe is introduced to guarantee the UE's feedback information (RI/PMI/CQI) generation and PUCCH and PUSCH feedback signal generation time. Specifically, the feedback transmitted at $n^{th}$ subframe includes the feedback information generated at the time corresponding to $(n-1)^{th}$ subframe.

Figure 8:
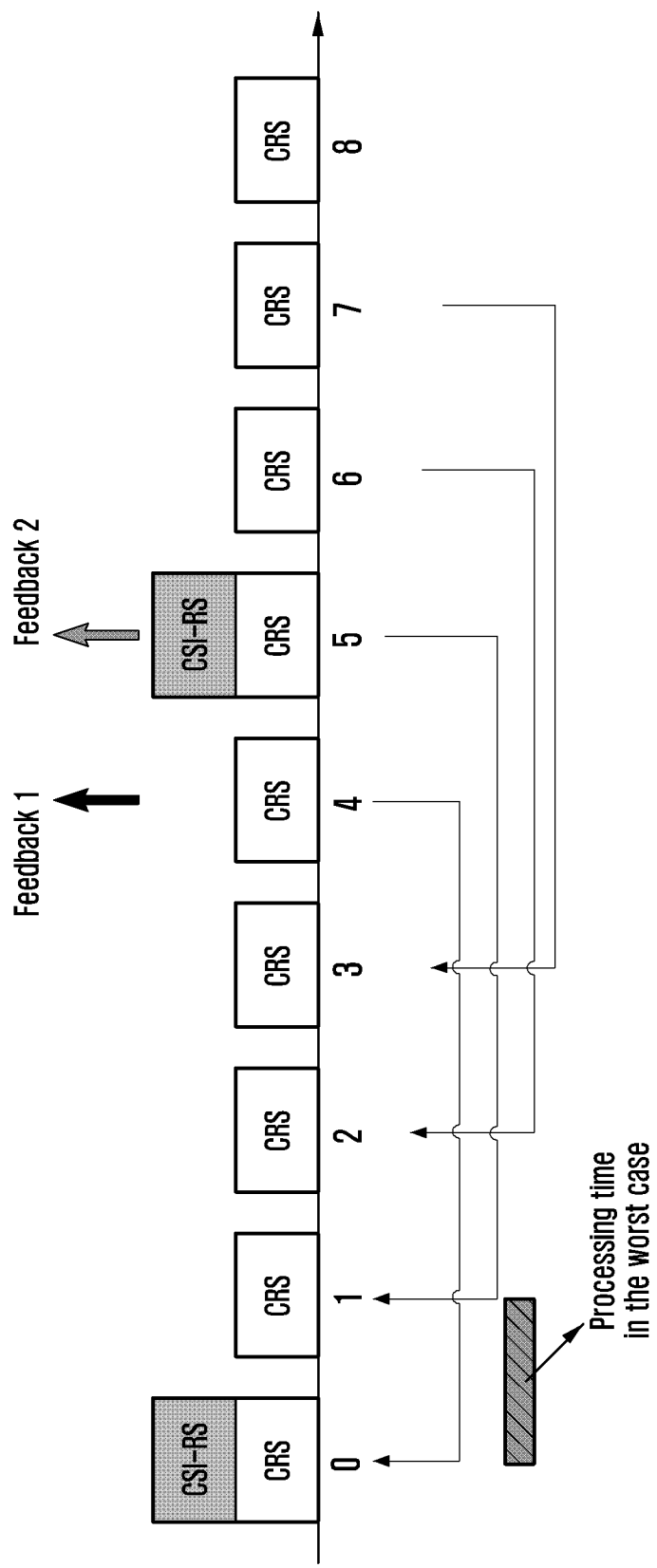
FIG. 8 is a diagram illustrating a concept of a reference subframe for use in an LTE-A system, according to an embodiment of the present invention.

FIG. 8 is a diagram illustrating a concept of the reference subframe for use in the LTE-A system, according to an embodiment of the present invention.

Referring to FIG. 8, the $4^{th}$ subframe corresponds to the $0^{th}$ subframe so as to include information on the channel measured based on CSI-RS transmitted at the $0^{th}$ subframe and information on the interference measured based on CRS transmitted at the same subframe. However, although it corresponds to the $1^{st}$ subframe, since the $5^{th}$ subframe carries no CSI-RS, the UE performs the channel estimation using CSI-RS transmitted at the $0^{th}$ subframe and the interference estimation using the CRS transmitted at the $1^{st}$ subframe. The reason for configuring the $(n-4)^{th}$ subframe as the reference subframe for feedback at the nth subframe is to secure at least 4 ms for the UE to generate feedback information and PUCCH and PUSCH feedback signal. The time of 4 ms may be changed depending on the embodiment.

Typically, the UE is configured to include a block for generating feedback information (CSI process) and a block for generating PUCCH and PUSCH feedback signals. The feedback information generation block may be implemented with one process per UE and, in this case, it is impossible to generate a plurality of feedback information on a plurality of channel states, and thus, have only one CSI process in a specific time duration. Referring to FIG. 8, the first CSI process for feedback transmission at the $4^{th}$ subframe starts at the $0^{th}$ subframe, and the second CSI process for feedback transmission at the $5^{th}$ subframe starts at the $1^{st}$ subframe. Only one of the two CSI processes has to be done in the duration of the $1^{st}$ to $4^{th}$ subframes in which the first and second CSI processes are overlapped. By taking notice of the consecutive feedback transmission at the subsequent subframes, the LTE-A UE equipped with one process for the CSI process has to have the capability to complete one CSI-RS process within one subframe duration. Specifically, it is necessary for the LTE-A UE to complete one at least one CSI-RS process in 1 ms or to elongate the processing time with plural processors.

Since the size-constrained UE cannot use plural processors, it is typical that the LTE-A UE is embodied with one processor to CSI within 1 ms. There is therefore a need for a method for processing CSI efficiently only with one processor.

Figure 9:
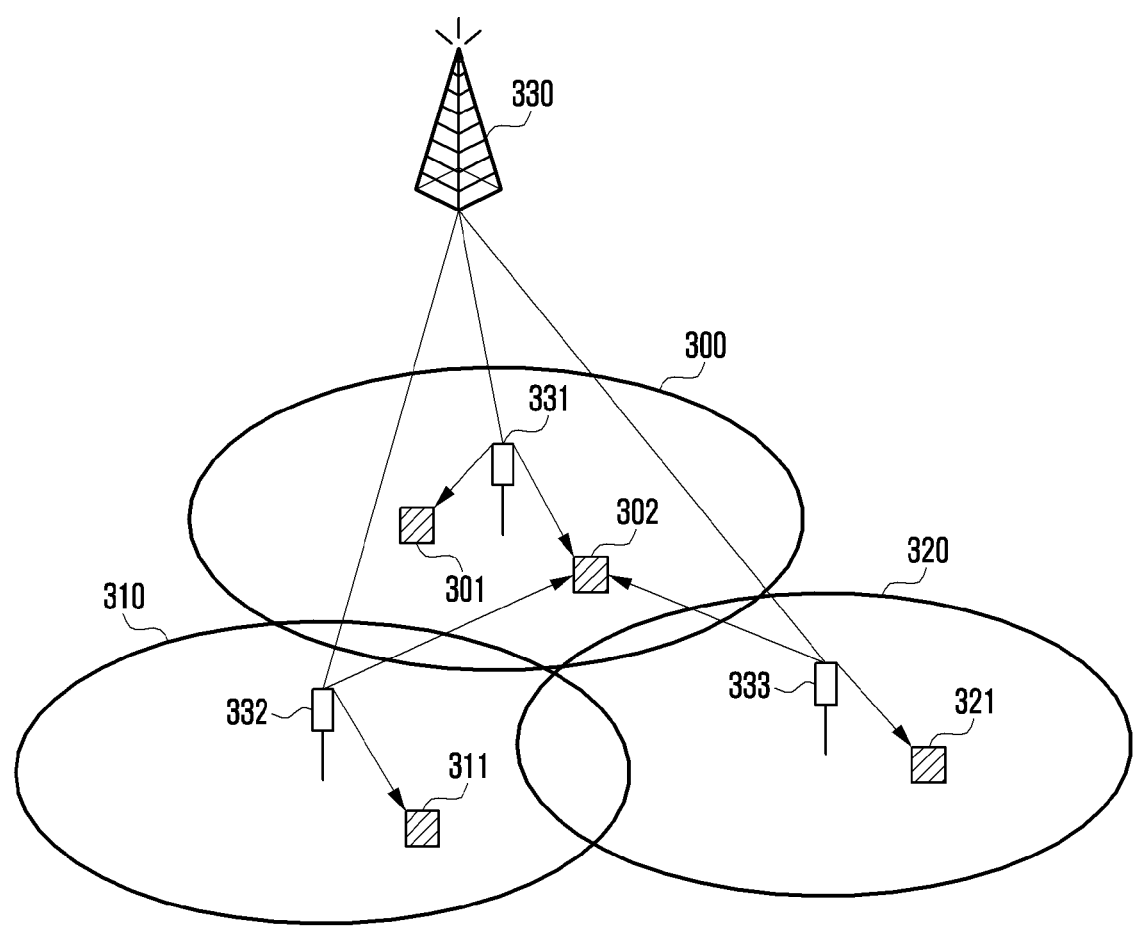
FIG. 9 is a diagram illustrating a cellular mobile communication system architecture, according to an embodiment of the present invention.

FIG. 9 is a diagram illustrating a cellular mobile communication system architecture, according to an embodiment of the present invention. FIG. 9 is directed to a cellular mobile communication system including three cells. In an embodiment of the present invention, the cell includes the data transmission region for the service of a predetermined transmission point, and transmission points may be Remote Radio Heads (RRHs) sharing cell-ID with the macro eNB within the macro area or macro and pico cells having different cell-IDs.

A central controller 330 transmits/receives data to/from the user and processes the data to be transmitted and received. If the transmission points are RRHs sharing the cell-ID with the macro eNB, the macro eNB may be referred to as central controller. If the transmission points are macro or pico cells having different cell-IDs, a device managing the cells integrally is referred to as central controller.

Referring to FIG. 9, the cellular mobile communication system includes cells 300, 310, and 320, UEs 301, 311, and 321 receiving data from the closest cell, and the UE 302 served by the cells 300, 310, and 320 in CoMP transmission mode. Each of the UEs 301, 311, and 321 receiving data from the closest cell performs channel estimation using CSI-RS of its own serving cell and transmits feedback information to the central controller 330.

However, the UE 302 receiving data from the three cells 300, 310, and 320 in the CoMP mode has to estimate channels from all three cells 300, 310, and 320.

Accordingly, the central controller 330 allocates three CSI-RS resources to the UE 302 for the respective cells. A description is made of the method for the central controller 330 to allocate CSI-RS resources to the UE 302 with reference to FIG. 10.

Figure 10:
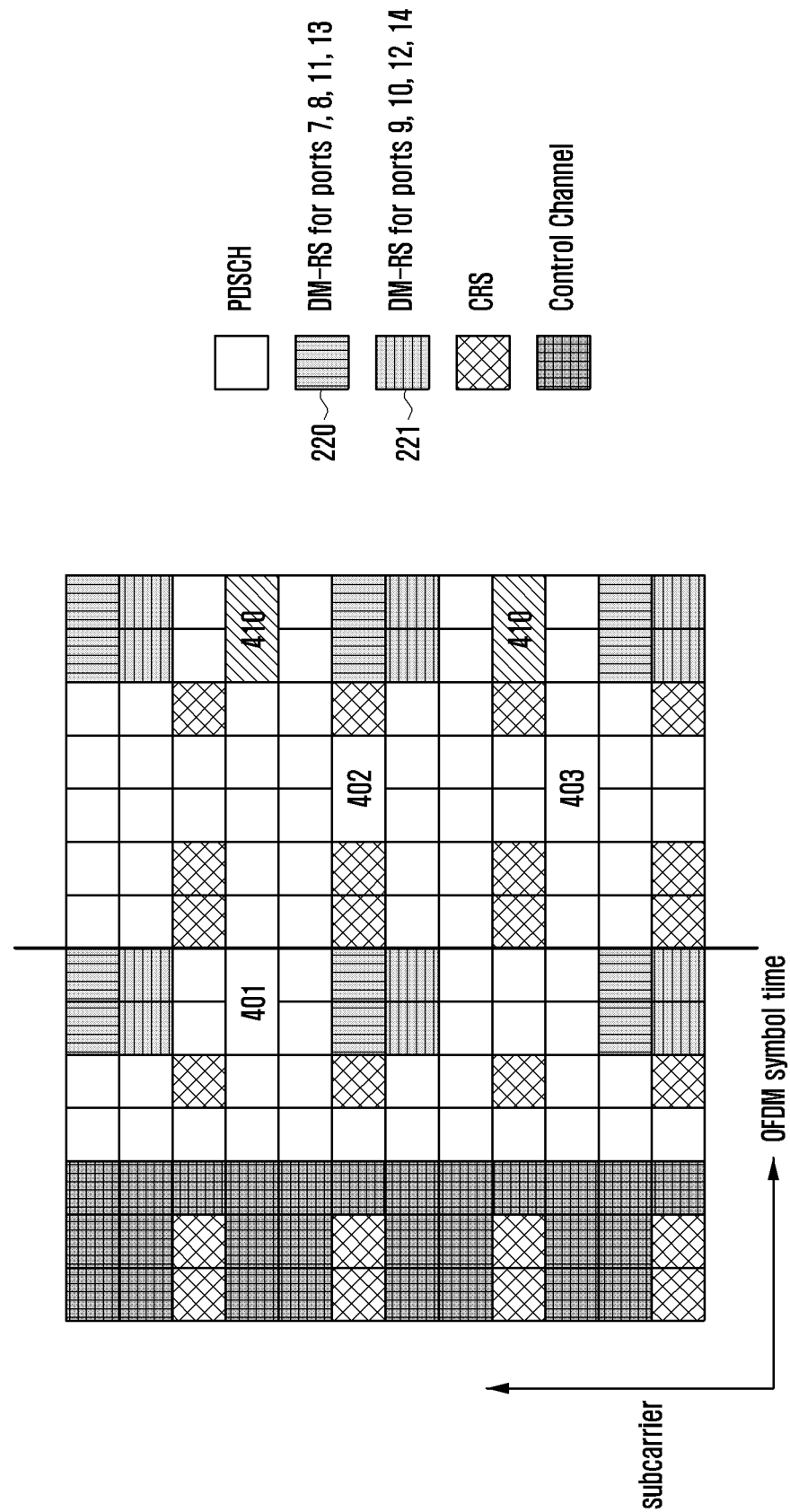
FIG. 10 is a diagram illustrating a resource block with CSI-RS patterns, according to an embodiment of the present invention.

FIG. 10 is a diagram illustrating a resource block with CSI-RS patterns, according to an embodiment of the present invention.

Referring to FIGS. 9 and 10, the central controller 330 allocates three CSI-RS resources 401, 402, and 403 to the UE 302 for CoMP transmission through the three cells 300, 310, and 320, and transmits CSI-RSs using the corresponding resources.

In this embodiment of the present invention, reference number 401 denotes the CSI-RS resource for channel estimation in the cell 300, reference number 402 the CSI-RS resource for channel estimation in the cell 310, and reference number 403 the CSI-RS resource for channel estimation in the cell 320. A set of the resources for transmitting at least one CSI-RS for channel estimation at a CoMP UE, or a set of the cells corresponding to the CSI-RS resources, is referred to as measurement set.

The central controller 330 may allocate an additional resource to the UE 302 for interference measurement. The data amount which the UE is capable of receiving in a unit time is influenced by the interference strength as well as the signal strength. Accordingly, the central controller 330 may allocate an Interference Measurement Resource (IMR) separately in order for the UE to measure only the interference.

The eNB may allocate one IMR to a UE in order for the UE to measure the interference applicable commonly to the signal component corresponding to all CSI-RSs in the measurement set or plural IMRs in order for the UE to measure various interference situations.

Referring to FIG. 10, the UE measures the signals from the three cells using the three CSI-RS resources 401, 402, and 403 and measures the interference occurring in receiving the signals from the three cells using IMR 410. At this time, the eNB controls the signal transmission of the neighbor cells on the resource 410 to which the interference to the UE is reflected well.

When a measurement set of plural cells and one or more IMRs are allocated to the UE 302, the eNB allocates a plurality of feedback resources to the UE 302 for potential signals and interferences, and the UE 302 generates feedback information and transmits the feedback information at a predetermined feedback timing.

If a plurality of feedback resources are allocated, this causes a problem such that the UE has to process large amount of CSI traffic in a short time as compared to the non-CoMP UE at plural CSI-RS and IMR reception timings and feedback timings.

Figure 11:
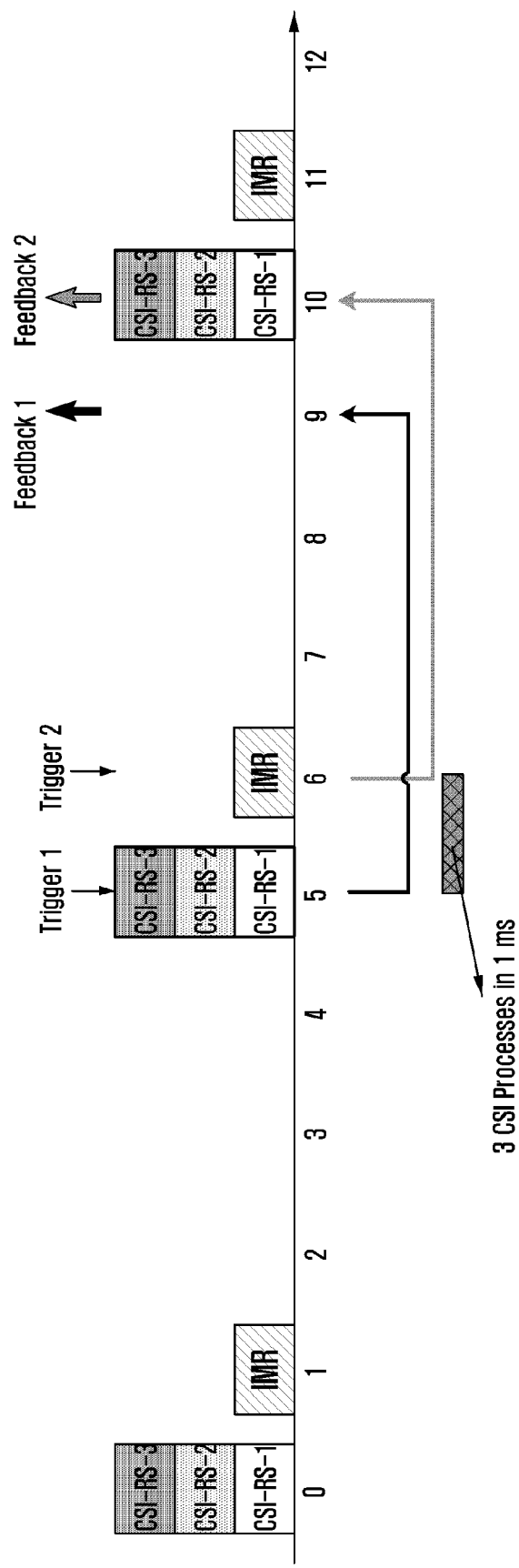
FIG. 11 is a diagram illustrating a feedback reference subframe configuration based on CSI-RS and IMR configuration of the CoMP UE, according to an embodiment of the present invention.

FIG. 11 is a diagram illustrating a feedback reference subframe configuration based on CSI-RS and IMR configuration of the CoMP UE, according to an embodiment of the present invention.

Referring to FIG. 11, the UE receives the measurement set of {CSI-RS-1, CSI-RS-2, CSI-RS-3} and CSI-RS-1, CSI-RS-2, and CSI-RS-3 for cell-1, cell-2, and cell-3. In an embodiment of the present invention, the three CSI-RSs are transmitted at an interval of 5 ms in the same subframe at the different resource positions.

Suppose that the eNB allocates one IMR to the UE, the IMR reflects the interference from the cells other than the measurement set, and three CSI-RSs are transmitted at the next subframe. Also suppose that the eNB has allocated to the UE the feedback resources corresponding to up to three signals and interference as shown in Table 4.

TABLE 4 feedback corresponding to various signal and interference situation

| | Signal component | Interference |
|---|---|---|
| CSI process 1 | CSI-RS-1 | IMR |
| CSI process 2 | CSI-RS-2 | IMR |
| CSI process 3 | CSI-RS-3 | IMR |

In an embodiment of the present invention, it is assumed that the UE receives scheduling of the non-periodic feedback corresponding to all CSI-RS processes at the $5^{th}$ subframe and $6^{th}$ subframe again. In this case, the UE has to measure three channels using the three CSI-RSs received at the $5^{th}$ subframe and the interference using IMR received at the 4th subframe including the most recent IMR among the previous subframes, and then has to estimate the three channels using the three CSI-RSs received at the $5^{th}$ subframe including the most recent CSI-RS among the previous subframe for generating another feedback information, and processes other three CSI-RSs after estimating the interference on the IMR indicated by the $6^{th}$ subframe.

If it has no plural processors for CSI process, the UE has to do the three CSI-RS processes at the $5^{th}$ subframe before the $6^{th}$ subframe starts. Accordingly, if the UE is assigned three CSI processes for CoMP operation, the UE has to have the capability capable of completing up to three CSI-RS processes in 1 ms and this means that this capability is faster triple times than the non-CoMP UE. If it is impossible to acquire the processor faster than triple times that of the legacy LTE-A UE, the UE has to be equipped with the processors connected in parallel more triple times than the legacy LTE-A UE in number. Specifically, in order for the UE to operate normally in the CoMP mode with the feedback reference frame and CSI-RS and IMR transmission timings defined in the legacy LTE-A without any restriction, the UE assigned N feedbacks has to have the processor faster N times than the legacy processor or N processors each having the processing capability equal to the legacy processor. If it is fulfilled, the UE is capable of transmitting the feedback information as scheduled.

In an embodiment of the present invention, a method for performing a plurality of CSI-RS processes for plural feedbacks with the CSI-RS processing capability of the non-CoMP LTE-A UE is proposed.

Specifically, embodiments of the present invention propose a method for the legacy LTE-A UE capability of processing one CSI-RS process within 1 ms to generate and feeds back a plurality of feedback information.

It is necessary to understand the reason for requiring faster processing capability when the UE has been assigned a plurality of feedback for CoMP. On the analogy of the exemplary case of FIG. 11, there are two reasons as follows:

Change in channel and interference estimation resource occurring at a short subframe interval; and Non-periodic feedback scheduling occurring at a short subframe interval.

As for the first reason, if three CSI-RS transmissions are followed by a new IMR transmission at the next subframe, as shown in FIG. 11, the UE has to update all feedback information by reflecting the new IMR. If the distance between three CSI-RSs and IMR is greater than 1 ms, the UE may elongate the feedback information update interval.

Although a new IMR is transmitted, if the timing for reflecting it to the feedback information is deferred, this may make the UE elongate the feedback information update interval.

The second reason for the fast CSI process processing capability requirement for a plurality of feedback is because, if the non-periodic feedback scheduling for all CSI processes at the consecutive subframes, as shown in FIG. 11, the UE has to complete all the CSI processes at an interval of 1 ms. If the subframe interval for non-periodic feedback is set to a large value, the UE may complete the CSI processes in a long duration. The CSI process handling methods for a CoMP system, according to embodiments of the present invention, are described in detail below.

An embodiment of the present invention proposes a method for the CoMP UE to generate and transmit a plurality of feedback information with the capability of processing one CSI process within 1 ms as the aim of the present disclosure by resolving the first reason for the requirement of the fast CSI processing capability of the CoMP UE.

In an embodiment of the present invention, the UE generates the feedback information at a valid subframe and transmits the feedback information to the eNB under the assumption that that the valid subframe as the reference frame for UE's feedback transmission occurs at an interval of P ms.

Specifically, although a new CSI-RS or IMR has been transmitted at a certain frame, if the subframe is not a valid subframe, the UE does not update the feedback information with the newly transmitted CSI-RS or IMR but with the CSI-RS or IMR transmitted newly at the valid subframe occurring at the interval of P ms. According to an embodiment of the present invention, if there is neither CSI-RS nor IMR transmitted at the valid subframe, the UE updates the feedback information based on the most recently received CSI-RS or IMR information among the subframes prior to the valid subframe.

Figure 12:
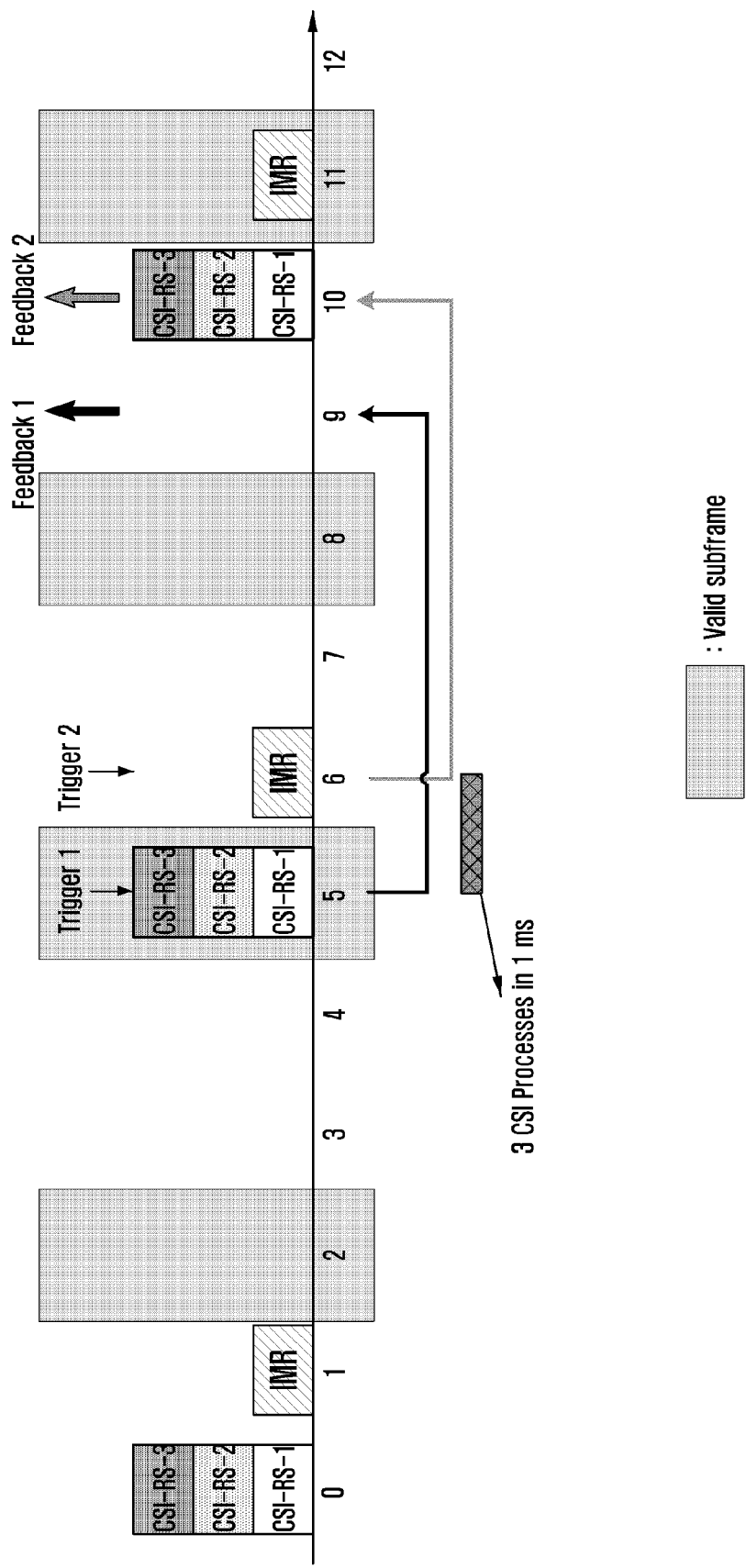
FIG. 12 is a diagram illustrating valid subframe configuration for feedback reference subframe, according to an embodiment of the present invention.

FIG. 12 is a diagram illustrating valid subframe configuration for feedback reference subframe, according to an embodiment of the present invention.

In FIG. 12, suppose that the UE is assigned the feedback as shown in Table 4 and the valid subframe occurs at an interval of 3 ms with the offset of 2 ms. It may be assumed that the non-periodic feedback for all feedback is scheduled at the 5$^{th}$ subframe and the 6$^{th}$ subframe consecutively. If no valid subframe is defined, the UE has to update all feedback information by reflecting IMR of the 6$^{th}$ subframe. Otherwise, if the valid subframe is defined, it is not necessary for the UE to update the feedback information based on the 6$^{th}$ subframe but use the feedback information of the 5$^{th}$ subframe as it is since the 6$^{th}$ subframe is not a valid subframe.

Specifically, if the UE processes the CSI process by updating the feedback information at the valid subframe occurring at the interval P ms, the UE assigned N feedbacks may process N CSI-RS process in P ms. According to an embodiment of the present invention, if P is set to a value equal to or greater than N, the UE is capable of generating and feeding back the feedback information for all assigned feedbacks.

In order to assume that the UE updates the feedback information at only the valid subframe occurring at the interval P ms, it is necessary to define the reference subframe for feedback in the system as follows:

The reference subframe for feedback transmission at the n$^{th}$ subframe is (n−4)$^{th}$ subframe and has O ms offset at an interval of P ms.

A description is made of the method for configuring valid subframe interval P and offset O.

The first method for configuring the valid subframe interval P and offset O is implemented in such a way that the eNB transmits RRC information indicating P and O value and the UE configure the valid subframe using these values. The O may be set to a value of unique UE ID mod P without extra RRC information. In more detail, the offset O value is distributed regularly for UEs to avoid increasing the number of UEs having a specific offset value statistically such that the eNB is capable of receiving the feedback information of the UE.

The second method for configuring the valid subframe interval P and offset O is implemented in such a way that the UE configures the number of assigned feedbacks (or CSI processes) as P value and receives the O value in the RRC information from the eNB. For example, if three feedbacks are assigned as shown in Table 4, the UE sets P to 3 and checks the O value in the RRC information. The offset O may also be set to value of unique UE ID mod P too. In this method, if the UE is capable of processing one CSI process within 1 ms always regardless of the number of assigned feedbacks although there is no need of extra RRC information on the valid subframe interval, it is possible to support the CoMP operation. The UE assigned one feedback is capable of configuring every subframe as valid subframe like the LTE-A non-CoMP operation.

Figure 13:
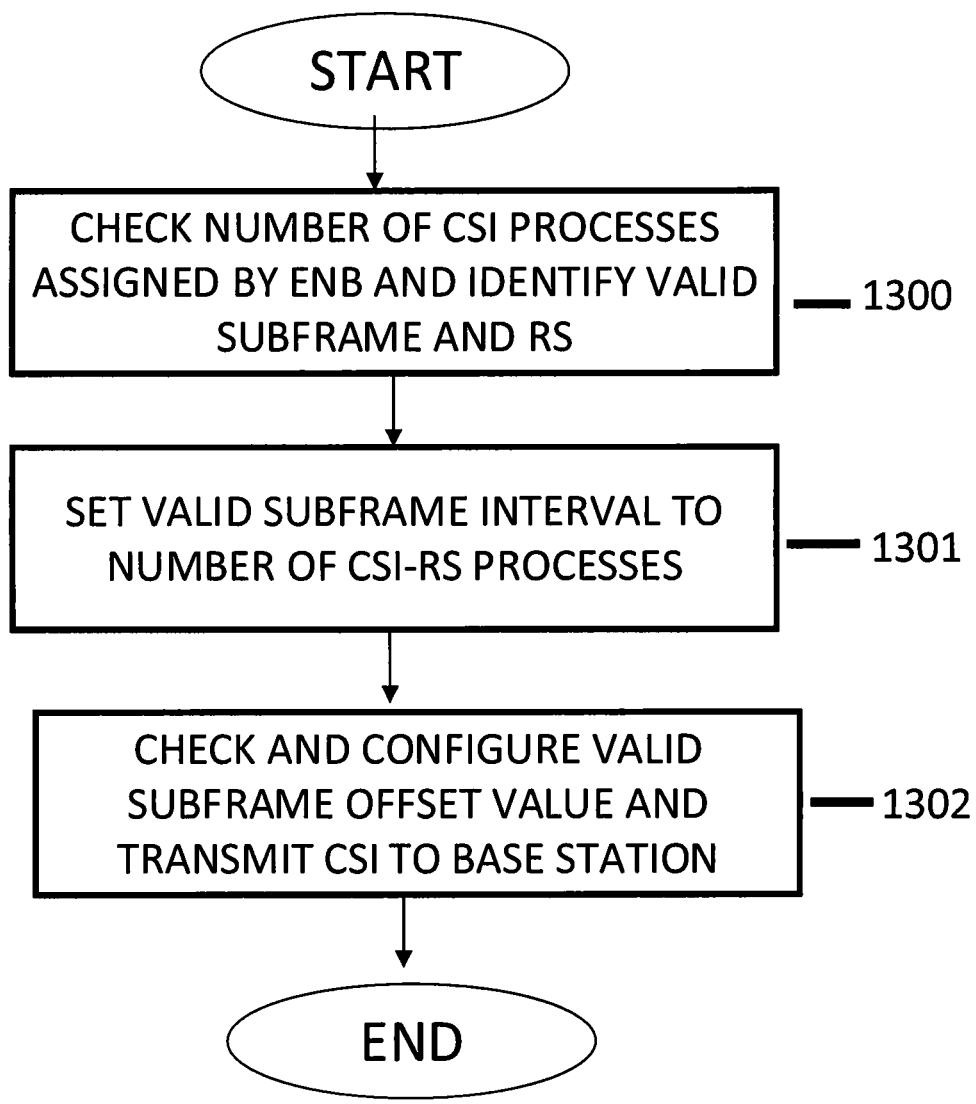
FIG. 13 is a flowchart illustrating a procedure of configuring a valid subframe interval and offset of the UE in the channel estimation method, according to an embodiment of the present invention.

FIG. 13 is a flowchart illustrating a procedure of configuring a valid subframe interval and offset of the UE in the channel estimation method, according to an embodiment of the present invention.

Referring to FIG. 13, the UE checks a number of CSI processes assigned by the eNB, in step 1300, and sets the valid subframe interval to a value of the number of assigned CSI processes, in step 1301. The UE checks the RRC information or unique UE ID to set the valid subframe offset value, in step 1302.

The third method for configuring the valid subframe interval P and offset O is implemented in such a way that the UE checks a number of assigned feedbacks (or CSI processes) and, if the number of assigned feedbacks (or CSI processes) is greater than 1, sets the valid subframe interval P and offset O to specific values. Otherwise, the number of feedbacks is 1, P to 1. The values set for P and O may be predetermined values or indicated by RRC information. The P and O values may also be determined according to the first and second methods. The predetermined value of P may be 5 as the minimum interval for CSI-RS and IMR transmission, or 3 or 4 as the maximum number of feedbacks that can be assigned to the UE. The predetermined value of O may be the transmission offset of the CSI-RS or IMR transmission having the minimum index. The reason for using this method is to configure every subframe as the valid subframe in order for the non-CoMP UE assigned one CSI process to operate normally as in LTE-A non-CoMP mode.

Figure 14:
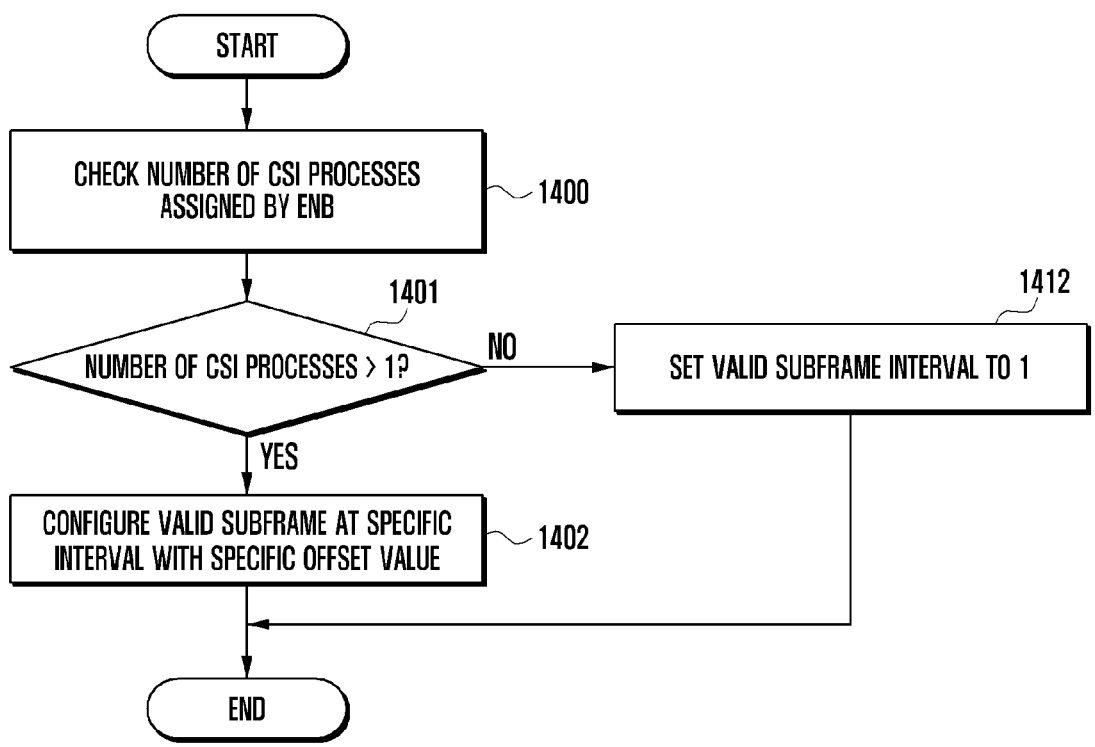
FIG. 14 is a flowchart illustrating a procedure of configuring a valid subframe interval and offset of the UE in the channel estimation method, according to another embodiment of the present invention.

FIG. 14 is a flowchart illustrating a procedure of configuring a valid subframe interval and offset of the UE in the channel estimation method, according to another embodiment of the present invention.

Referring to FIG. 14, the UE checks the number of CSI processes assigned by the eNB, in step 1400, and determines whether the number of assigned CSI processes is greater than 1, in step 1401. If the number of assigned CSI processes is greater than 1, the UE sets the valid subframe interval and offset to predetermined values, in step 1402. If the number of assigned CSI processes is not greater than 1, the UE sets the valid subframe interval to 1, in step 1412.

In the LTE-A system, a UE may be configured to operate in Carrier Aggregation (CA) mode so as to operate on a plurality of independent Component Carriers (CC). The UE is assigned CSI-RS and IMR per CC, and thus, CSI processes per. The valid subframe interval and offset determination method may be applied per CC or based on the sum of the CSI processes assigned for all the component carriers. If the valid subframe interval and offset determination method is applicable per CC, the UE checks the CSI processes assigned per CC and configures the valid subframe period and offset according to the number of CSI processes assigned per CC.

Referring to FIG. 14, if the UE is assigned two CSI processes for the first CC and one CSI process for the second CC, the UE sets the valid subframe interval on the first CC to 5 (or 3) and the valid subframe interval on the second CC to 1. Otherwise, if the valid subframe interval and offset determination method is applied to the sum of CSI processes assigned for all carrier components, the UE may always set the valid subframe interval to 5 (or 3).

Another embodiment of the present invention provides a method for the CoMP UE to generate and transmit a plurality of feedback information only with the capability of processing one CSI process within 1 ms as the aim of the present invention by resolving the second reason for the requirement of the fast CSI process processing capability of the CoMP UE in such a way of making it possible to transmit the feedback information occurring at a short subframe interval in the non-periodic feedback scheduling mode.

In this embodiment of the present invention, the eNB sets the valid subframe interval capable of non-periodic feedback transmission scheduling for the UE to P ms and performs scheduling the non-periodic feedback only at the corresponding valid subframe.

Specifically, the UE ignores the non-periodic feedback transmission scheduling at a subframe that is not the valid subframe. The UE checks the non-periodic feedback scheduling only at the valid subframe at the interval of P ms to process N CSI processes in P ms. If P is set to a value equal to or greater than N, the UE is capable of processing all assigned feedback by processing one CSI process per 1 ms.

The method for configuring the valid subframe interval and offset is identical with the method for configuring the feedback reference subframe as the valid subframe in the embodiment 1. Specifically, the first method is implemented in such a way that the eNB sends the UE the RRC information indicating P and O values and the UE configures the valid subframe using these values, which may be set to the value of unique UE ID mode P without extra RRC information.

The second method for configuring the valid subframe interval P and offset O is implemented in such a way that the UE sets P to the number of assigned feedbacks (or CSI processes) checks the value of O in the RRC information transmitted by the eNB. For example, if three feedbacks are assigned as shown in Table 3, the UE sets P to 3 and checks the RRC information to acquire the value of O. In this case, O may be set to the value of unique UE ID mod P without extra RRC information. This method makes it possible for the UE to support CoMP operation if it is capable of processing one CSI process within 1 ms always regardless of the number of assigned feedbacks even without extra RRC information. Also, the UE assigned one feedback is capable of configuring every subframe as valid subframe like the LTE-A non-CoMP operation.

The third method for configuring the valid subframe interval P and offset O is implemented in such a way that UE checks a number of assigned feedbacks (or CSI processes) and, if the number of assigned feedbacks (or CSI processes) is greater than 1, sets the valid subframe interval P and offset O to specific values. Otherwise the number of feedbacks is 1, P to 1. The values set for P and O may be predetermined values or indicated by RRC information. The predetermined value of P may be 5 as the minimum interval for CSI-RS and IMR transmission or 3 or 4 as the maximum number of feedbacks that can be assigned to the UE. The predetermined value of O may be the transmission offset of the CSI-RS or IMR transmission having the minimum index. The reason for using this method is to configure every subframe as the valid subframe in order for the non-CoMP UE assigned one CSI process to operate normally as in LTE-A non-CoMP mode.

In the LTE-A system, a UE may be configured to operate in a CA mode so as to operate on a plurality of independent CC. The UE is assigned CSI-RS and IMR per CC and thus CSI processes per CC. The valid subframe interval and offset determination method may be applied per CC or based on the sum of the CSI processes assigned for all the component carriers.

If the valid subframe interval and offset determination method is applied per CC, the UE checks the CSI processes assigned per CC and configures the valid subframe period and offset according to the number of CSI processes assigned per CC. Referring to FIG. 14, if the UE is assigned two CSI processes for the first CC and one CSI process for the second CC, the UE sets the valid subframe interval on the first CC to 5 (or 3) and the valid subframe interval on the second CC to 1. Otherwise, if the valid subframe interval and offset determination method is applied to the sum of CSI processes assigned for all carrier components, the UE may always set the valid subframe interval to 5 (or 3).

Figure 15:
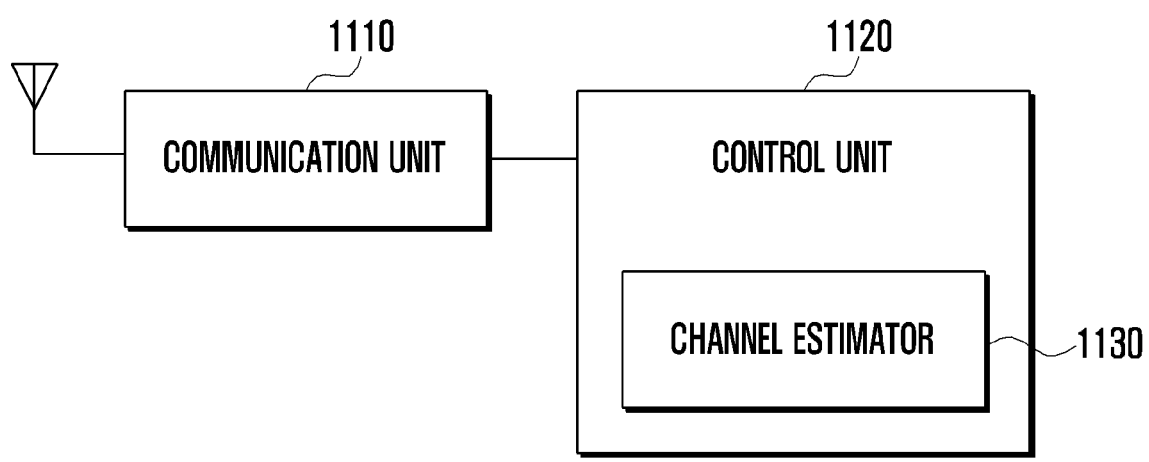
FIG. 15 is a block diagram illustrating a configuration of a UE, according to an embodiment of the present invention.

FIG. 15 is a block diagram illustrating the configuration of the UE, according to an embodiment of the present invention.

Referring to FIG. 15, the UE includes a communication unit 1110 and a control unit 1120.

The communication unit 1110 is responsible of transmitting and receiving data to and from the outside. Here, the communication unit 1110 is capable of transmitting the channel information for CoMP technique to the central controller under the control of the control unit 1120.

The control unit 1120 controls the states and operations of all components constituting the UE. Here, the control unit 1120 may configure the feedback information for CoMP transmission in the valid subframe and perform feedback update only in the corresponding subframe to feedback the channel information to the central controller. In order to accomplish this, the control unit 1120 includes a channel estimator 1130.

The channel estimator 1130 determines the feedback information based on the measurement set and interference-related information and valid subframe configuration received from the central controller, and estimates the signal and interference using received CSI-RS and IMR. The channel estimator 1130 is also capable of controlling the communication unit 1110 to feed back the channel information related to CoMP.

Although the description is directed to the case that the UE is composed of the communication unit 1110 and the control unit 1120, the configuration of the UE is not limited thereto. Specifically, the UE may include further components responsible for various functions. For example, the UE is capable of including a display unit for displaying current UE state, an input unit for receiving the user input for executing a function, and a storage unit for storing data generated by the UE.

Figure 16:
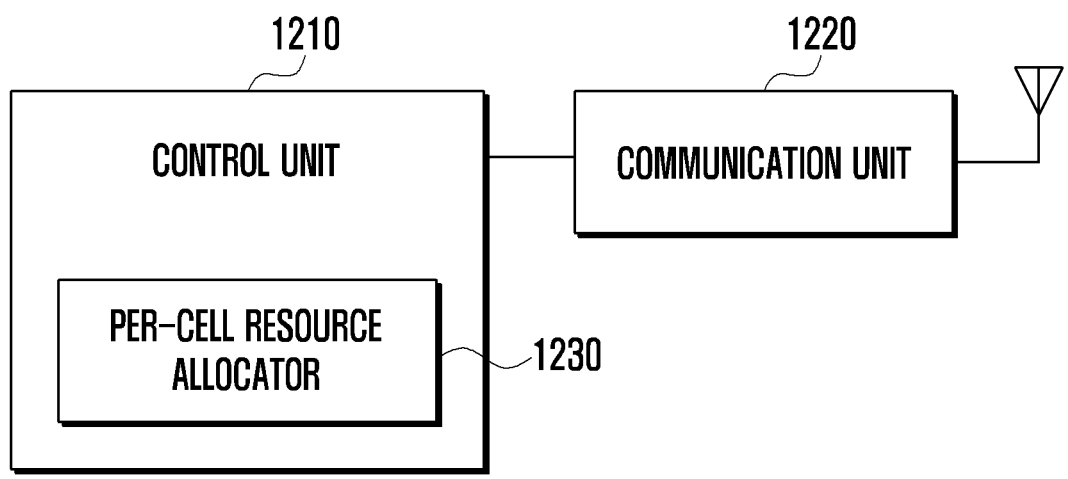
FIG. 16 is a block diagram illustrating a configuration of a central controller, according to an embodiment of the present invention.

FIG. 16 is a block diagram illustrating the configuration of the central controller, according to an embodiment of the present invention.

Referring to FIG. 16, the central controller includes a controller 1210 and a communication unit 1220.

The control unit 1210 controls the states and operations of all the components of the central controller. Here, the control unit 1210 allocates CSI-RS resource and IMR per cell for UE's channel estimation and configure the valid subframe and non-periodic feedback indicator. For this purpose, the control unit 1210 is provided with a per-cell resource allocator 1230.

The per-cell resource allocator 1230 allocates CSI-RS resource in order for the UE to estimate channel of each cell and transmits CSI-RS on the corresponding resource. The resource allocated per cell corresponds to CSI-RS transmitted for channel estimation in the corresponding cell. The IMR is configured appropriately per UE for reflecting interference efficiently.

The communication unit 1220 is responsible for transmitting and receiving data to and from the UE or the cell managed by the central controller. Here, the communication unit 1220 transmits CSI-RS, IMR, and non-periodic feedback indicator to the UE on the allocated resource and receives the channel information feedback from the UE under the control of the control unit 1210.

The channel estimation method and apparatus of the present invention is capable of supporting Cooperative Multi-Point (CoMP) of the adjacent cells to transmit data to the UE located at the cell boundary cooperatively.

Also, the channel estimation method and apparatus of the present invention is capable of providing the terminal with the mobile communication service efficiently in consideration of interference through cooperation among the cells.

Also, the channel estimation method and apparatus of the present invention is capable of allowing the UE located at the cell boundary to select its serving cell dynamically.

Also, the channel estimation method and apparatus of the present invention is capable of allowing plural cells to transmit certain information to a UE simultaneously, resulting in improvement of information reception rate.

Furthermore, the channel estimation method and apparatus of the present invention is capable of serving all the UE within the cellular mobile communication system at evenly high data rate regardless of their location within the cell.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method by a terminal in a communication system, the method comprising:
receiving information on at least one process related to channel information, wherein the information comprises a number of the at least one process related to the channel information assigned for a terminal;
identifying one or more valid subframes corresponding to the at least one process based on the information on the at least one process, wherein identifying the one or more valid subframes comprises identifying an interval corresponding to the at least one process based on the number of the process related to the channel;
identifying whether a reference signal is received on one of the identified one or more valid subframes;
generating, when the reference signal is received on the one of the identified one or more valid subframes, channel status information corresponding to the at least one process based on the received reference signal; and
transmitting the generated channel status information corresponding to the at least one process to a base station.

2. The method of claim 1, wherein identifying the one or more valid subframes comprises identifying the interval of each of the one or more valid subframes and an offset for identifying a start point of the one or more valid subframes corresponding to the at least one process based on the information on the at least one process.

3. The method of claim 2, wherein identifying the one or more valid subframes comprises:
receiving a periodicity value and an offset value corresponding to the at least one process in a radio resource control (RRC) message; and
identifying the interval and the offset corresponding to the at least one process based on the periodicity value and the offset value.

4. The method of claim 2, wherein identifying the one or more valid subframes comprises:
receiving a periodicity value corresponding to the at least one process in a radio resource control (RRC) message;
identifying the offset corresponding to the at least one process based on an identifier value of the terminal; and
identifying the interval corresponding to the at least one process based on the periodicity value.

5. The method of claim 2, wherein identifying the one or more valid subframes further comprises identifying the interval corresponding to the at least one process based on a number of pieces of channel status information.

6. The method of claim 2, wherein identifying the one or more valid subframes further comprises, when the terminal is operating in a carrier aggregation mode, identifying at least one of the interval and the offset corresponding to the at least one process per component carrier.

7. The method of claim 3, wherein identifying the one or more valid subframes further comprises, when a number of the at least one process is 1, setting the interval corresponding to the at least one process to 1.

8. The method of claim 1, wherein generating the channel status information comprises generating the channel status information of the one or more valid subframes corresponding to the at least one process based on at least one of channel status information reference signals (CSI-RSs) and an interference measurement resource (IMR) received at a most recent subframe, from among the previous subframes including the one or more valid subframes corresponding to the at least one process.

9. A terminal in a communication system, the terminal comprising:
a transceiver for transmitting and receiving a signal; and
a controller configured to:
receive information on at least one process related to channel information, wherein the information comprises a number of the at least one process related to the channel information;
identify one or more valid subframes corresponding to the at least one process based on the information on at least one process, wherein identifying the one or more valid subframes comprises identifying an interval corresponding to the at least one process based on the number of the process related to the channel;
identify whether a reference signal is received on one of the identified one or more valid subframes;
generate, when the reference signal is received on the one of the identified one or more valid subframes channel status information corresponding to the at least one process based on the received reference signal; and
transmit the generated channel status information corresponding to the at least one process to a base station.

10. The terminal of claim 9, wherein the controller is further configured to identify the interval of each of the one or more valid subframes and an offset for determining a start point of the one or more valid subframes corresponding to the at least one process based on the information on the at least one process.

11. The terminal of claim 10, wherein the controller is further configured to:
receive a periodicity value and an offset value corresponding to the at least one process in a radio resource control (RRC) message; and
identify the interval and the offset corresponding to the at least one process based on the periodicity value and the offset value.

12. The terminal of claim 10, wherein the controller is further configured to:
receive a periodicity value corresponding to the at least one process in a radio resource control (RRC) message;
identify the offset corresponding to the at least one process based on an identifier value of the terminal; and
identify the interval corresponding to the at least one process based on the periodicity value.

13. The terminal of claim 10, wherein the controller is further configured to
identify the interval corresponding to the at least one process based on a number of pieces of channel status information.

14. The terminal of claim 13, wherein, the controller is further configured to set, when a number of the at least one process is 1, the interval corresponding to the at least one process to 1.

15. The terminal of claim 9, wherein the controller is further configured to:
receive channel status information reference signals (CSI-RSs) and an interference measurement resource (IMR); and
generate the channel status information of the one or more valid subframes corresponding to the at least one process based on the CSI-RSs and the IMR received at a most recent subframe, from among the previous subframes including the one or more valid subframes corresponding to the at least one process.

16. The terminal of claim 9, wherein the controller is further configured to identify, when the terminal is operating in a carrier aggregation mode, at least one of the interval and the offset corresponding to the at least one process per component carrier.

17. The method of claim 1, further comprising:
generating, when the reference signal is not received on a most recent valid subframe corresponding to the at least one process, the channel status information based on a reference signal received on the most recent subframe, from among previous subframes.

18. The terminal of claim 9, wherein the controller is further configured to generate, when the reference signal is not received on a most recent valid subframe corresponding to the at least one process, the channel status information based on a reference signal received on the most recent subframe, from among previous subframes.

* * * * *